United States Patent
Iizuka

(10) Patent No.: US 10,920,870 B2
(45) Date of Patent: Feb. 16, 2021

(54) LUBRICATION STRUCTURE OF POWER TRANSMISSION DEVICE

(71) Applicant: HONDA MOTOR CO., LTD., Tokyo (JP)

(72) Inventor: Natsumi Iizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 15/908,814

(22) Filed: Mar. 1, 2018

(65) Prior Publication Data
US 2018/0266537 A1   Sep. 20, 2018

(30) Foreign Application Priority Data
Mar. 17, 2017  (JP) ................... 2017-053403

(51) Int. Cl.
*F16H 57/04* (2010.01)
*F16H 57/021* (2012.01)
*F16H 3/66* (2006.01)

(52) U.S. Cl.
CPC ....... *F16H 57/0423* (2013.01); *F16H 57/021* (2013.01); *F16H 57/0457* (2013.01); *F16H 57/0471* (2013.01); *F16H 57/0484* (2013.01); *F16H 3/66* (2013.01); *F16H 2200/0069* (2013.01); *F16H 2200/2012* (2013.01);
(Continued)

(58) Field of Classification Search
CPC .............. F16H 57/0423; F16H 57/021; F16H 57/0457; F16H 57/0471; F16H 57/0484; F16H 3/66; F16H 2200/0089; F16H 2200/2012; F16H 2200/2046;
(Continued)

(56) References Cited

U.S. PATENT DOCUMENTS

2018/0106359 A1*  4/2018  Kawakami .......... F16H 57/0483
2019/0145509 A1*  5/2019  Yu ....................... F16H 57/0457
                                                              184/11.1

FOREIGN PATENT DOCUMENTS

JP         59-140962      8/1984
JP         2011-058519    3/2011
                  (Continued)

OTHER PUBLICATIONS

Japanese Office Action for corresponding JP Application No. 2017-053403, dated Aug. 7, 2018.

*Primary Examiner* — Michael R Mansen
*Assistant Examiner* — Robert T Reese
(74) *Attorney, Agent, or Firm* — Mori & Ward, LLP

(57) ABSTRACT

A lubrication structure of a power transmission device includes a housing, a bearing, a baffle, and an additional lubricating oil supply mechanism. A driven gear is to be housed in the housing. The bearing is provided in the housing to rotatably support the driven gear. The baffle is provided in the housing above the bearing in a height direction of the power transmission device. The baffle includes a tubular oil supply passage and a lubricating oil receiver. Lubricating oil is supplied to the bearing via the tubular oil supply passage. The lubricating oil receiver is connected to and is provided above the tubular oil supply passage in the height direction to receive lubricating oil splashed by the driven gear in order to supply the received lubricating oil to the tubular oil supply passage. The additional lubricating oil supply mechanism is to supply lubricating oil to the tubular oil supply passage.

7 Claims, 8 Drawing Sheets

(52) U.S. Cl.
CPC ............... *F16H 2200/2046* (2013.01); *F16H 2200/2048* (2013.01); *F16H 2200/2066* (2013.01); *F16H 2200/2082* (2013.01)

(58) Field of Classification Search
CPC ..... F16H 2200/2048; F16H 2200/2066; F16H 2200/2087
See application file for complete search history.

(56) References Cited

FOREIGN PATENT DOCUMENTS

| | | |
|---|---|---|
| JP | 2013-194771 | 9/2013 |
| JP | 2016-061333 | 4/2016 |

\* cited by examiner

FIG. 4

| | C1 | C2 | C3 | B1 | B2 | B3 | F1 | TRANSMISSION GEAR RATIO | GEOMETRIC RATIO |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

ABSTRACT

LUBRICATION STRUCTURE OF POWER TRANSMISSION DEVICE

CROSS-REFERENCE TO RELATED APPLICATIONS

The present application claims priority under 35 U.S.C. § 119 to Japanese Patent Application No. 2017-053403, filed Mar. 17, 2017, entitled "Lubrication Structure of Power Transmission Device." The contents of this application are incorporated herein by reference in their entirety.

BACKGROUND

1. Field

The present disclosure relates to a lubrication structure of a power transmission device.

2. Description of the Related Art

Some existing power transmission devices mounted on a vehicle or the like include a transmission that outputs driving power of an internal combustion engine while changing gears, a differential device that distributes the driving power output from transmission to left and right driving wheels, and a transfer device that distributes the driving power transmitted to the differential device to other driving wheels that are located in the front-back direction.

An existing lubrication structure of a power transmission device of this type (see, for example, Japanese Unexamined Patent Application Publication No. 2016-061333) functions as follows: when a final driven gear splashes lubricating oil in an oil sump in a housing, a baffle plate of the final driven gear receives a part of the splashed lubricating oil, the baffle plate guides the received lubricating oil along a surface thereof to a bearing that rotatably supports the final driven gear in the housing, and the lubricating oil lubricates the bearing.

SUMMARY

According to one aspect of the present invention, a lubrication structure of a power transmission device is a lubrication structure for lubricating a bearing that rotatably supports a final driven gear disposed in a housing of the power transmission device. The lubrication structure includes a lubricating oil supply mechanism that supplies lubricating oil to an internal component disposed in the housing, and a baffle that is located in the housing and above the bearing. The baffle includes a tubular oil supply passage that guides the lubricating oil to the bearing from above the bearing; and a lubricating oil receiving surface that is disposed above the oil supply passage, that receives the lubricating oil splashed by the final driven gear, and that guides the lubricating oil to the oil supply passage. The lubricating oil supply mechanism supplies the lubricating oil to the oil supply passage.

According to another aspect of the present invention, a lubrication structure of a power transmission device includes a housing, a bearing, a baffle, and an additional lubricating oil supply mechanism. A driven gear is to be housed in the housing. The bearing is provided in the housing to rotatably support the driven gear. The baffle is provided in the housing above the bearing in a height direction of the power transmission device. The baffle includes a tubular oil supply passage and a lubricating oil receiver. Lubricating oil is supplied to the bearing via the tubular oil supply passage. The lubricating oil receiver is connected to and is provided above the tubular oil supply passage in the height direction to receive lubricating oil splashed by the driven gear in order to supply the received lubricating oil to the tubular oil supply passage. The additional lubricating oil supply mechanism is to supply lubricating oil to the tubular oil supply passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a table showing engagement states of engagement mechanisms of the transmission shown in FIG. 2 for respective gears.

DESCRIPTION OF THE EMBODIMENTS

Figure 1:
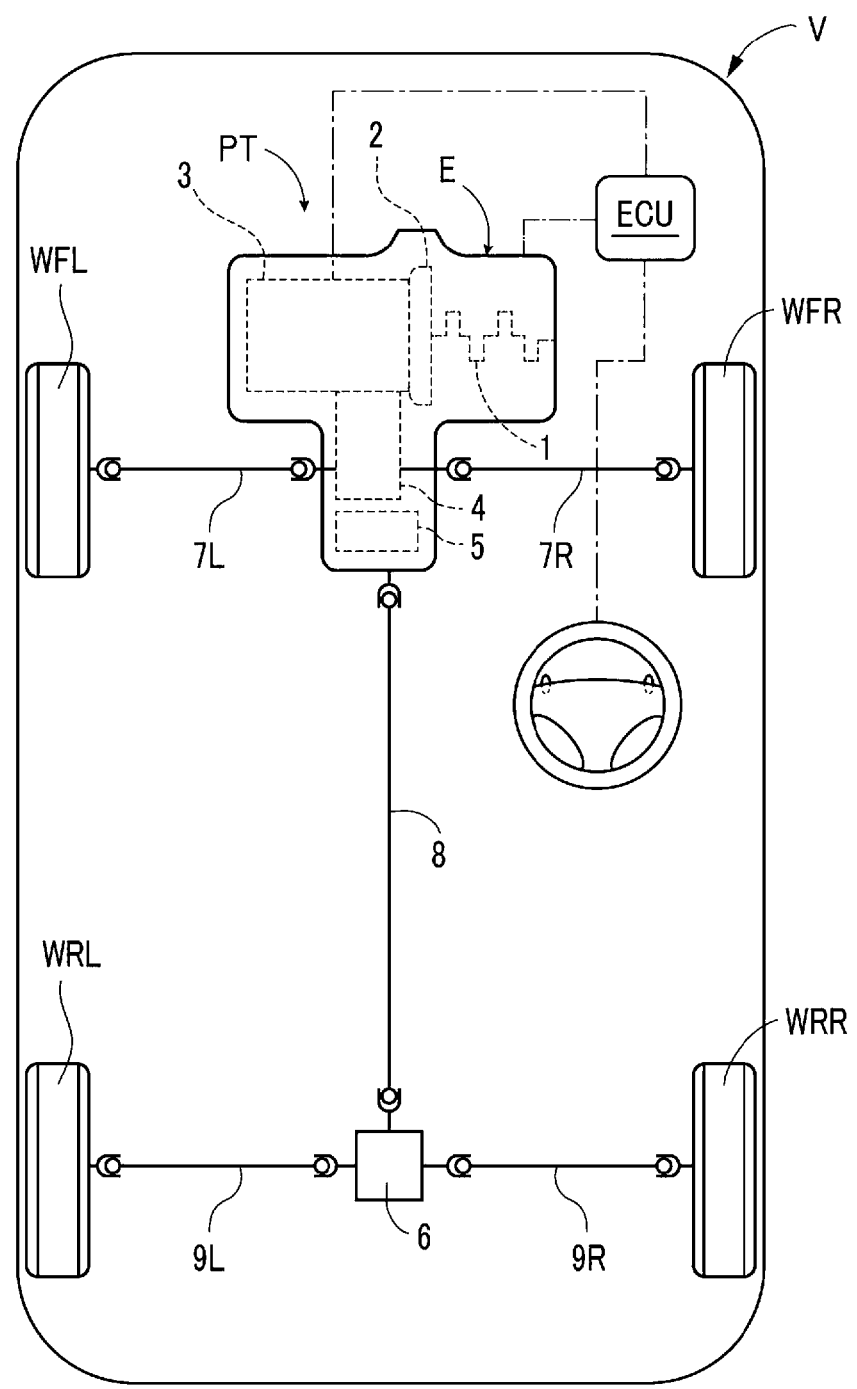
FIG. 1 is a schematic view of a vehicle in which a power transmission device including a lubrication structure according to an embodiment is mounted.

The embodiments will now be described with reference to the accompanying drawings, wherein like reference numerals designate corresponding or identical elements throughout the various drawings.

Hereinafter, a vehicle in which a power transmission device including a lubrication structure according to an embodiment is mounted will be described with reference to the drawings.

As illustrated in FIG. 1, an engine E (internal combustion engine, drive source) is transversally mounted in a vehicle V so that a crankshaft 1 extends in the left-right direction of the body of the vehicle V. Driving power of the engine E is transmitted via a power transmission device PT to a left front wheel WFL, a right front wheel WFR, a left rear wheel WRL, and a right rear wheel WRR.

The power transmission device PT includes a torque converter 2 connected to the crankshaft 1, a transmission 3 connected to the torque converter 2, a front differential gear 4 (differential device) connected to the transmission 3, a transfer device 5 connected to the front differential gear 4, and a rear differential gear 6 connected to the transfer device 5.

The front differential gear 4 is connected to the left front wheel WFL and the right front wheel WFR via a left front axle 7L and a right front axle 7R. The rear differential gear 6 is connected to the transfer device 5 via a propeller shaft 8 and is connected to the left rear wheel WRL and the right rear wheel WRR via a left rear axle 9L and a right rear axle 9R.

Figure 2:
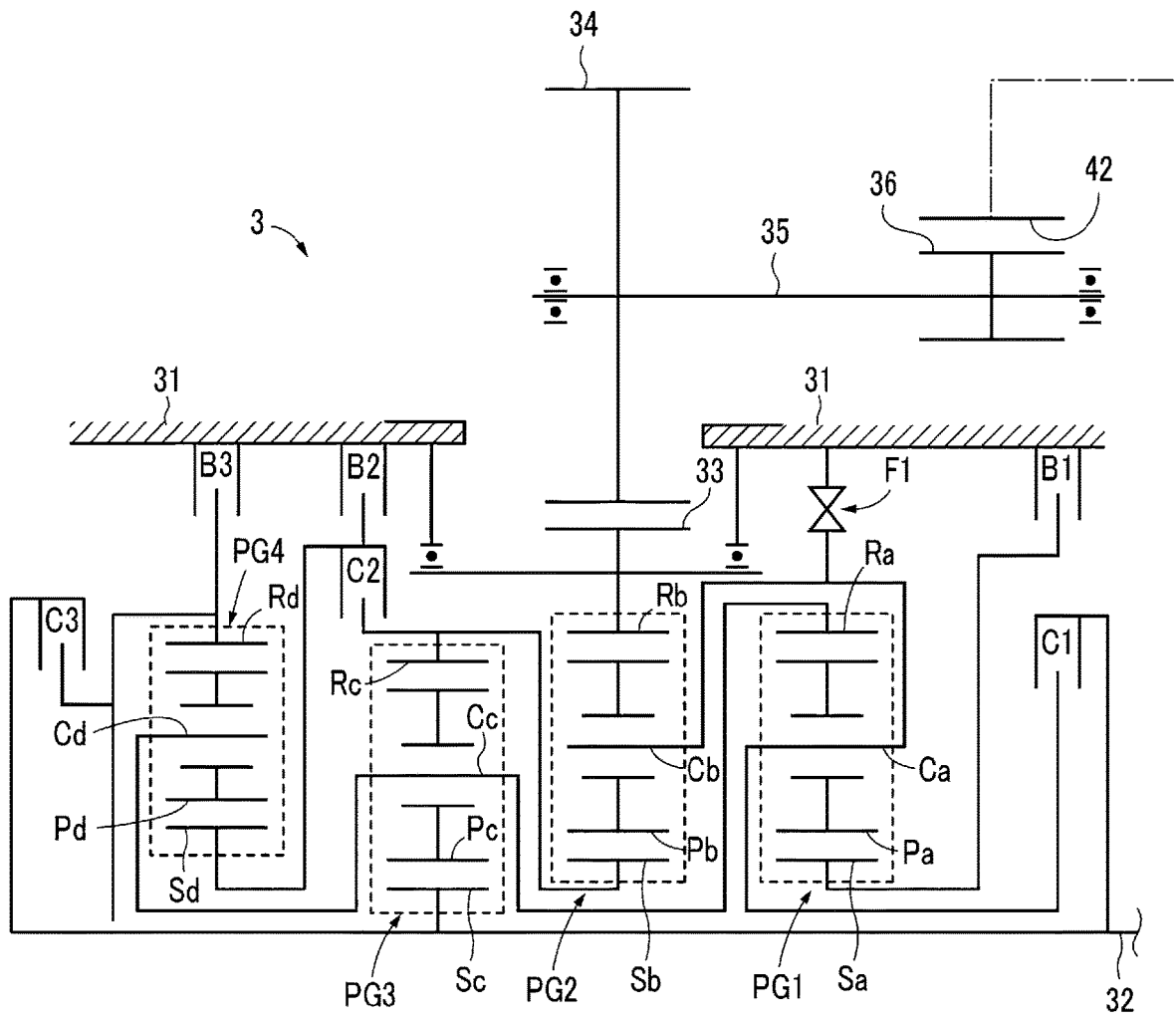
FIG. 2 is a skeleton diagram of a transmission mounted in the vehicle shown in FIG. 1.

As shown in the skeleton diagram of FIG. 2, the transmission 3 includes an input shaft 32 that is rotatably supported in a transmission case 31 (housing), and an output member 33 including an output gear that is disposed coaxially with the input shaft 32.

Driving power output from the engine E is transmitted to the input shaft 32 via the torque converter 2, which includes a lock-up clutch and a damper.

Rotation of the output member 33 is transmitted to the left front wheel WFL and the right front wheel WFR (see FIG. 1) via an idling gear 34 that meshes with the output member 33, an idling shaft 35 that rotatably supports the idling gear 34, a final drive gear 36 that is rotatably supported by the idling shaft 35, and a final driven gear 42 (that is, the front differential gear 4) that meshes with the final drive gear 36.

The power transmission device PT may include, instead of the torque converter 2, a single-disc starting clutch or a multi-disc starting clutch that is configured to be frictionally engageable.

In the transmission case 31, in order from the engine E side, a first planetary gear mechanism PG1, a second planetary gear mechanism PG2, a third planetary gear mechanism PG3, and a fourth planetary gear mechanism PG4 are arranged so as to be coaxial with the input shaft 32.

The third planetary gear mechanism PG3 is a single-pinion planetary gear mechanism including a sun gear Sc, a ring gear Rc, and a carrier Cc that rotatably and revolvably supports a pinion Pc that meshes with the sun gear Sc and the ring gear Rc.

A single-pinion planetary gear mechanism is also called a minus planetary gear mechanism or a negative planetary gear mechanism because, when the carrier is fixed and the sun gear is rotated, the ring gear rotates in a direction different from the direction in which the sun gear rotates. Note that, in a single-pinion planetary gear mechanism, when the ring gear is fixed and the sun gear is rotated, the carrier rotates in a direction the same as the direction in which the sun gear rotates.

Figure 3:
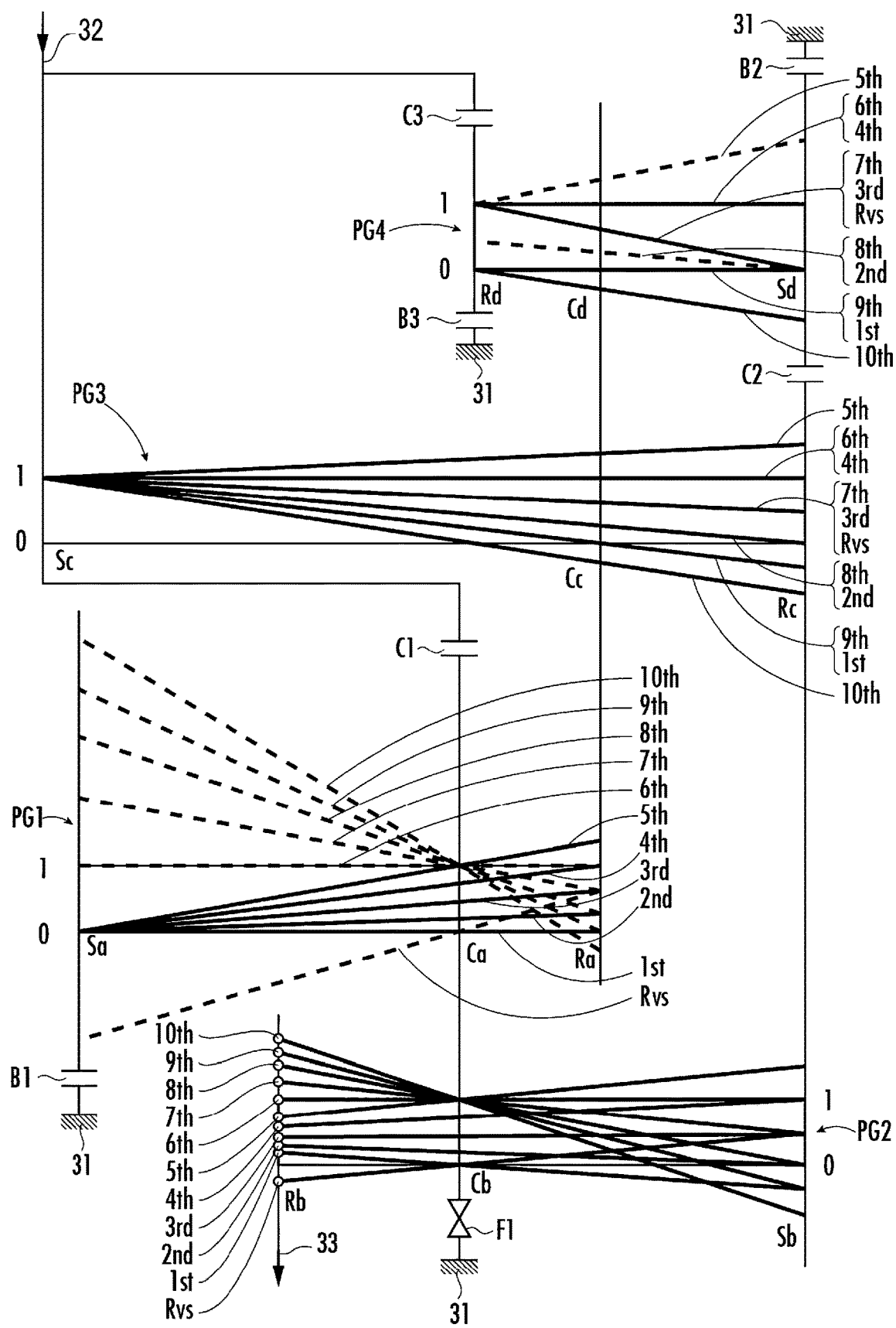
FIG. 3 shows collinear diagrams of planetary gear mechanisms of the transmission shown in FIG. 2.

The second part of FIG. 3 from above shows the collinear diagram of the third planetary gear mechanism PG3. Note that the term "collinear diagram" refers to a diagram that can represent the ratio of the relative rotation speed of three elements, which are a sun gear, a carrier, and a ring gear, by using a straight line (velocity line). In the collinear diagram, the three elements of the third planetary gear mechanism PG3, which are the sun gear Sc, the carrier Cc, and the ring gear Rc, are arranged in order of a first element, a second element, and a third element from the left side with distances corresponding to the gear ratio (the number of teeth of the ring gear/the number of teeth of the sun gear). Then, the first element is the sun gear Sc, the second element is the carrier Cc, and the third element is the ring gear Rc.

Here, the ratio of the distance from the sun gear Sc to the carrier Cc to the distance from the carrier Cc to the ring gear Rc is h:1, where h is the gear ratio of the third planetary gear mechanism PG3. In the collinear diagram, a lower horizontal line and an upper horizontal line (a line that overlap 4th and 6th) respectively represent that the rotation speed is "0" and "1" (the same rotation speed as the input shaft 32).

The fourth planetary gear mechanism PG4 is also a single-pinion planetary gear mechanism including a sun gear Sd, a ring gear Rd, and a carrier Cd that rotatably and revolvably supports a pinion Pd that meshes with the sun gear Sd and the ring gear Rd.

The first part of FIG. 3 from above (the uppermost part of FIG. 3) shows the collinear diagram of the fourth planetary gear mechanism PG4. In the collinear diagram, the three elements of the fourth planetary gear mechanism PG4, which are the sun gear Sd, the carrier Cd, and the ring gear Rd, are arranged in order of a fourth element, a fifth element, and a sixth element from the left side with distances corresponding to the gear ratio. Then, the fourth element is the ring gear Rd, the fifth element is the carrier Cd, and the sixth element is the sun gear Sd.

Here, the ratio of the distance from the sun gear Sd to the carrier Cd to the distance from the carrier Cd to the ring gear Rd is i:1, where i is the gear ratio of the fourth planetary gear mechanism PG4.

The first planetary gear mechanism PG1 is also a single-pinion planetary gear mechanism including a sun gear Sa, a ring gear Ra, and a carrier Ca that rotatably and revolvably supports a pinion Pa that meshes with the sun gear Sa and the ring gear Ra.

The third part of FIG. 3 from above shows the collinear diagram of the first planetary gear mechanism PG1. In the collinear diagram, the three elements of the first planetary gear mechanism PG1, which are the sun gear Sa, the carrier Ca, and the ring gear Ra, are arranged in order of a seventh element, an eighth element, and a ninth element from the left side with distances corresponding to the gear ratio. Then, the seventh element is the sun gear Sa, the eighth element is the carrier Ca, and the ninth element is the ring gear Ra.

Here, the ratio of the distance from the sun gear Sa to the carrier Ca to the distance from the carrier Ca to the ring gear Ra is j:1, where j is the gear ratio of the first planetary gear mechanism PG1.

The second planetary gear mechanism PG2 is also a single-pinion planetary gear mechanism including a sun gear Sb, a ring gear Rb, and a carrier Cb that rotatably and revolvably supports a pinion Pb that meshes with the sun gear Sb and the ring gear Rb.

The fourth part of FIG. 3 from above (the lowermost part of FIG. 3) shows the collinear diagram of the second planetary gear mechanism PG2. In the collinear diagram, the three elements of the second planetary gear mechanism PG2, which are the sun gear Sb, the carrier Cb, and the ring gear Rb, are arranged in order of a tenth element, an eleventh element, and a twelfth element from the left side with distances corresponding to the gear ratio. Then, the tenth element is the ring gear Rb, the eleventh element is the carrier Cb, and the twelfth element is the sun gear Sb.

Here, the ratio of the distance from the sun gear Sb to the carrier Cb to the distance from the carrier Cb to the ring gear Rb is k:1, where k is the gear ratio of the second planetary gear mechanism PG2.

The sun gear Sc (first element) of the third planetary gear mechanism PG3 is coupled to the input shaft 32. The ring gear Rb (tenth element) of the second planetary gear mechanism PG2 is coupled to the output member 33, which includes an output gear.

The carrier Cc (second element) of the third planetary gear mechanism PG3, the carrier Cd (fifth element) of the fourth planetary gear mechanism PG4, and the ring gear Ra (ninth element) of the first planetary gear mechanism PG1 are coupled to form a first coupled body Cc-Cd-Ra.

The ring gear Rc (third element) of the third planetary gear mechanism PG3 and the sun gear Sb (twelfth element) of the second planetary gear mechanism PG2 are coupled to form a second coupled body Rc-Sb.

The carrier Ca (eighth element) of the first planetary gear mechanism PG1 and the carrier Cb (eleventh element) of the second planetary gear mechanism PG2 are coupled to form a third coupled body Ca-Cb.

The transmission 3 includes seven engagement mechanisms that include three clutches, which are a first clutch C1, a second clutch C2, and a third clutch C3; three brakes, which are a first brake B1, a second brake B2, and a third brake B3; and one two-way clutch F1.

The first clutch C1 a hydraulic wet multi-disc clutch. The first clutch C1 is switchable between a coupling state in which the first clutch C1 couples the sun gear Sc (first element) of the third planetary gear mechanism PG3 to the third coupled body Ca-Cb and a release state in which the first clutch C1 does not couple the sun gear Sc to the third coupled body Ca-Cb.

The third clutch C3 is a hydraulic wet multi-disc clutch. The third clutch C3 is switchable between a coupling state in which the third clutch C3 couples the sun gear Sc (first element) of the third planetary gear mechanism PG3 to the ring gear Rd (fourth element) of the fourth planetary gear mechanism PG4 and a release state in which the third clutch C3 does not couple the sun gear Sc to the ring gear Rd.

The second clutch C2 is a hydraulic wet multi-disc clutch. The second clutch C2 is switchable between a coupling state in which the second clutch C2 couples the sun gear Sd (sixth element) of the fourth planetary gear mechanism PG4 to the second coupled body Rc-Sb and a release state in which the second clutch C2 does not couple the sun gear Sd to the second coupled body Rc-Sb.

The two-way clutch F1 also functions as a fourth brake B4. The two-way clutch F1 is switchable between a reverse-rotation inhibiting state in which the two-way clutch F1 allows forward rotation (rotation in the same rotation direction as the input shaft 32 and the output member 33) of the third coupled body Ca-Cb and inhibits reverse rotation of the third coupled body Ca-Cb, and a fixing state in which the two-way clutch F1 fixes the third coupled body Ca-Cb to the transmission case 31.

When the two-way clutch F1 in the reverse-rotation inhibiting state and a force for rotating the third coupled body Ca-Cb in the forward direction is applied to the third coupled body Ca-Cb, this rotation is allowed and the two-way clutch F1 enters a release state. On the other hand, when a force for rotating the third coupled body Ca-Cb in the reverse direction is applied to the third coupled body Ca-Cb, this rotation is inhibited and the two-way clutch F1 enters the fixing state fixed to the transmission case 31.

The first brake B1 is a hydraulic wet multi-disc brake. The first brake B1 is switchable between a fixing state in which the first brake B1 fixes the sun gear Sa (seventh element) of the first planetary gear mechanism PG1 to the transmission case 31, and a release state in which the first brake B1 does not fix the sun gear Sa to the transmission case 31.

The second brake B2 is a hydraulic wet multi-disc brake. The second brake B2 is switchable between a fixing state in which the second brake B2 fixes the sun gear Sd (sixth element) of the fourth planetary gear mechanism PG4 to the transmission case 31, and a release state in which the second brake B2 does not fix the sun gear Sd to the transmission case 31.

The third brake B3 is a hydraulic wet multi-disc brake. The third brake B3 is switchable between a fixing state in which the third brake B3 fixes the ring gear Rd (fourth element) of the fourth planetary gear mechanism PG4 to the transmission case 31, and a release state in which the third brake B3 does not fix the ring gear Rd to the transmission case 31.

Switching of the three clutches, which are the first clutch C1, the second clutch C2, and the third clutch C3; switching of the three brakes, which are the first brake B1, the second brake B2, and the third brake B3; and switching of the one two-way clutch F1 are controlled by a gear-change control device ECU (see FIG. 1), including a transmission controller unit (TCU), on the basis of vehicle information, such as the driving speed of the vehicle V, sent from an integrated control unit (not shown).

The gear-change control device ECU is an electronic unit (not shown) including a CPU, a memory, and the like. The gear-change control device ECU controls the transmission 3 by receiving predetermined vehicle information, such as the driving speed and the throttle opening degree of the vehicle V, the rotation speed and the output torque of the engine E, the operation information of a paddle shift lever, and the like; and by executing a control program stored in a storage device, such as a memory.

In the transmission 3, in order from a side on which the engine E and the torque converter 2 are disposed, the first clutch C1, the first planetary gear mechanism PG1, the second planetary gear mechanism PG2, the third planetary gear mechanism PG3, the second clutch C2, the fourth planetary gear mechanism PG4, and the third clutch C3 are arranged on the axis of the input shaft 32.

The third brake B3 is disposed outside in the radial direction of the fourth planetary gear mechanism PG4, the second brake B2 is disposed outside in the radial direction of the second clutch C2, the first brake B1 is disposed outside in the radial direction of the first clutch C1, and the two-way clutch F1 is disposed outside in the radial direction of the first planetary gear mechanism PG1.

Thus, in the transmission 3, the first brake B1, the second brake B2, the third brake B3, and the two-way clutch F1 are disposed outside in the radial directions of the planetary gear mechanisms or the clutches. With this structure, the axial length of the transmission 3 can be reduced compared with a case where the first brake B1, the second brake B2, the third brake B3, and the two-way clutch F1 are arranged on the axis of the input shaft 32 together with the planetary gear mechanisms.

The axial length of the transmission 3 can be reduced also by disposing the third brake B3 outside in the radial direction of the third clutch C3 and disposing the second brake B2 outside in the radial direction of the fourth planetary gear mechanism PG4.

Referring to FIGS. 3 and 4, how the transmission 3 according to the embodiment is shifted to respective gears will be described.

In FIG. 3, velocity lines shown by broken lines represent that, in synchronism with some of the first planetary gear mechanism PG1, the second planetary gear mechanism PG2, the third planetary gear mechanism PG3, and the fourth planetary gear mechanism PG4 that transmit power, elements of the other planetary gear mechanisms rotate (idle).

FIG. 4 is a table showing the states of three clutches, which are the first clutch C1, the second clutch C2, and the third clutch C3; the three brakes, which are the first brake B1, the second brake B2, and the third brake B3; and the one two-way clutch F1, for respective gears described below.

In FIG. 4, a circle in each of the columns for the first clutch C1, the second clutch C2, the third clutch C3, the first brake B1, the second brake B2, and the third brake B3 represents a coupling state or a fixing state; and a blank in each of the columns represents a release state. In the column for the two-way clutch F1, "R" represents a reverse-rotation inhibiting state and "L" represents a fixing state.

Underlined "R" and underlined "L" represent that the rotation speed of the third coupled body Ca-Cb is "0" due to the function of the two-way clutch F1. "R/L" represents that the two-way clutch F1 is normally in the reverse-rotation inhibiting state "R" and is switched to the fixing state "L" when using an engine brake.

FIG. 4 shows the transmission gear ratio (the rotation speed of the input shaft 32/the rotation speed of the output member 33) and the geometric ratio (the ratio between the transmission gear ratios for respective gears, which is calculated by diving the transmission gear ratio of predetermined gear by the transmission gear ratio of gear that is one step higher than the predetermined gear) for each gear when the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. As can be seen from FIG. 4, the geometric ratios can be appropriately set.

When shifting to first gear, the two-way clutch F1 is set to the reverse-rotation inhibiting state ("R" in FIG. 4), and the first brake B1 and the second brake B2 are each set to the fixing state.

By setting the two-way clutch F1 to the reverse-rotation inhibiting state (R) and setting the first brake B1 to the fixing state, reverse rotation of the third coupled body Ca-Cb and the sun gear Sa (seventh element) of the first planetary gear mechanism PG1 is inhibited, and the rotation speeds of the third coupled body Ca-Cb and the sun gear Sa (seventh element) of the first planetary gear mechanism PG1 become "0".

Thus, the sun gear Sa (seventh element), the carrier Ca (eighth element), and the ring gear Ra (ninth element) of the first planetary gear mechanism PG1 enter a locked state in which these gears are relatively unrotatable; and the rotation speed of the first coupled body Cc-Cd-Ra, including the ring gear Ra (ninth element) of the first planetary gear mechanism PG1, also becomes "0".

Then, the rotation speed of the ring gear Rb (tenth element) of the second planetary gear mechanism PG2, to which the output member 33 is coupled, becomes "1st" shown in FIG. 3, thereby shifting to first gear.

In order to shift to first gear, it is not necessary to set the second brake B2 to the fixing state. However, the second brake B2 is set to the fixing state in order that shifting from first gear to second gear (described below) can be smoothly performed. An engine brake can be used in first gear by switching the two-way clutch F1 from the reverse-rotation inhibiting state (R) to the fixing state (L).

When shifting to second gear, the two-way clutch F1 is set to the reverse-rotation inhibiting state ("R"), the first brake B1 and the second brake B2 are each set to the fixing state, and the second clutch C2 is set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0". By setting the second brake B2 to the fixing state, the rotation speed of the sun gear Sd (sixth element) of the fourth planetary gear mechanism PG4 becomes "0".

By setting the second clutch C2 to the coupling state, the rotation speed of the second coupled body Rc-Sb becomes "0", which is the same as the rotation speed of the sun gear Sd (sixth element) of the fourth planetary gear mechanism PG4.

Then, the rotation speed of the ring gear Rb (tenth element) of the second planetary gear mechanism PG2, to which the output member 33 is coupled, becomes "2nd" shown in FIG. 3, thereby shifting to second gear.

When shifting to third gear, the two-way clutch F1 is set to the reverse-rotation inhibiting state, the first brake B1 and the second brake B2 are each set to the fixing state, and the third clutch C3 is set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0". By setting the second brake B2 to the fixing state, the rotation speed of the sun gear Sd (sixth element) of the fourth planetary gear mechanism PG4 becomes "0".

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3, which is coupled to the input shaft 32.

Thus, the rotation speed of the sun gear Sd (sixth element) of the fourth planetary gear mechanism PG4 becomes "0", and the rotation speed of the ring gear Rd (fourth element) becomes "1". Therefore, the rotation speed of the carrier Cd (fifth element), that is, the rotation speed of the first coupled body Cc-Cd-Ra becomes i/(i+1).

Then, the rotation speed of the ring gear Rb (tenth element) of the second planetary gear mechanism PG2, to which the output member 33 is coupled, becomes "3rd" shown in FIG. 3, thereby shifting to third gear.

When shifting to fourth gear, the two-way clutch F1 is set to the reverse-rotation inhibiting state, the first brake B1 is set to the fixing state, and the second clutch C2 and the third clutch C3 are each set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0".

By setting the second clutch C2 to the coupling state, the sun gear Sd (sixth element) of the fourth planetary gear mechanism PG4 and the second coupled body Rc-Sb rotate at the same speed. Thus, between the third planetary gear mechanism PG3 and the fourth planetary gear mechanism PG4, the carrier Cc (second element) and the carrier Cd (fifth element) are coupled to each other, and the ring gear Rc (third element) and the sun gear Sd (sixth element) are coupled to each other. Therefore, in fourth gear, in which the second clutch C2 is in the coupling state, one collinear diagram including four elements of the third planetary gear mechanism PG3 and the fourth planetary gear mechanism PG4 can be drawn.

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3. Thus, the rotation speeds of two of the four elements of the third planetary gear mechanism PG3 and the fourth planetary gear mechanism PG4 become the same rotation speed "1".

Thus, the elements of the third planetary gear mechanism PG3 and the fourth planetary gear mechanism PG4 enter a locked state in which these elements are relatively unrotatable; and the rotation speeds of all elements of the third planetary gear mechanism PG3 and the fourth planetary gear mechanism PG4 become "1". The rotation speed of the third coupled body Ca-Cb becomes j/(j+1).

Then, the rotation speed of the ring gear Rb (tenth element) of the second planetary gear mechanism PG2, to which the output member 33 is coupled, becomes "4th" shown in FIG. 3, thereby shifting to fourth gear.

When shifting to fifth gear, the two-way clutch F1 is set to the reverse-rotation inhibiting state, the first brake B1 is set to the fixing state, and the first clutch C1 and the third clutch C3 are each set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0".

By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "5th" shown in FIG. 3, thereby shifting to fifth gear.

In order to shift to fifth gear, it is not necessary to set the third clutch C3 to the coupling state. However, because it is necessary to set the third clutch C3 to the coupling state in fourth gear and sixth gear (described below), the third clutch C3 is set to the couples state also in fifth gear so that downshift from fifth gear to fourth gear and upshift from fifth gear to sixth gear (described below) can be smoothly performed.

When shifting to sixth gear, the two-way clutch F1 is set to the reverse-rotation inhibiting state; and the first clutch C1, the second clutch C2, and the third clutch C3 are each set to the coupling state.

By setting the two-way clutch F1 to the reverse-rotation inhibiting state, forward rotation of the third coupled body Ca-Cb is allowed.

By setting each of the second clutch C2 and the third clutch C3 to the coupling state, as described above regarding fourth gear, the elements of the third planetary gear mechanism PG3 and the fourth planetary gear mechanism PG4 enter a relatively unrotatable state; and the rotation speed of the second coupled body Rc-Sb becomes "1". By setting the first clutch C1 to the coupling state, the rotation speed of the third coupled body Ca-Cb becomes "1".

Thus, in the second planetary gear mechanism PG2, the rotation speed of the carrier Cb (eleventh element) and the rotation speed of the sun gear Sb (twelfth element) become the same "1"; and the second planetary gear mechanism PG2 enters a locked state in which the elements are relatively unrotatable.

Then, the rotation speed of the ring gear Rb (tenth element) of the second planetary gear mechanism PG2, to which the output member 33 is coupled, becomes "6th" shown in FIG. 3, thereby shifting to sixth gear.

When shifting to seventh gear, the two-way clutch F1 is set to the reverse-rotation inhibiting state, the second brake B2 is set to the fixing state, and the first clutch C1 and the third clutch C3 are each set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0".

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3; and the rotation speed of the first coupled body Cc-Cd-Ra, including the carrier Cd (fifth element) of the fourth planetary gear mechanism PG4, becomes i/(i+1). By setting the first clutch C1 to the coupling state, the rotation speed of the third coupled body Ca-Cb becomes "1", which is the same as the rotation speed of the sun gear Sc (first element) of the third planetary gear mechanism PG3, which is coupled to the input shaft 32.

Then, the rotation speed of the ring gear Rb (tenth element) of the second planetary gear mechanism PG2, to which the output member 33 is coupled, becomes "7th" shown in FIG. 3, thereby shifting to seventh gear.

When shifting to eighth gear, the two-way clutch F1 is set to the reverse-rotation inhibiting state, the second brake B2 is set to the fixing state, and the first clutch C1 and the second clutch C2 are each set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0".

By setting the second clutch C2 to the coupling state, the rotation speed of the second coupled body Rc-Sb becomes "0", which is the same as the rotation speed of the sun gear Sd (sixth element) of the fourth planetary gear mechanism PG4. By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "8th" shown in FIG. 3, thereby shifting to eighth gear.

When shifting to ninth gear, the two-way clutch F1 is set to the reverse-rotation inhibiting state, the second brake B2 and the third brake B3 are each set to the fixing state, and the first clutch C1 is set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0". By setting the third brake B3 to, the fixing state, the rotation speed of the ring gear Rd (fourth element) of the fourth planetary gear mechanism PG4 also becomes "0".

Thus, the carrier Cd (fifth element), the ring gear Rd (fourth element), and the sun gear Sd (sixth element) of the fourth planetary gear mechanism PG4 enter a locked state in which these gears are relatively unrotatable; and the rotation speed of the first coupled body Cc-Cd-Ra, including the carrier Cd (fifth element) of the fourth planetary gear mechanism PG4, also becomes "0".

By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "9th" shown in FIG. 3, thereby shifting to ninth gear.

When shifting to tenth gear, the two-way clutch F1 is set to the reverse-rotation inhibiting state, the third brake B3 is set to the fixing state, and the first clutch C1 and the second clutch C2 are each set to the coupling state.

By setting the two-way clutch F1 to the reverse-rotation inhibiting state, forward rotation of the third coupled body Ca-Cb is allowed. By setting the third brake B3 to the fixing state, the rotation speed of the ring gear Rd (fourth element) of the fourth planetary gear mechanism PG4 becomes "0".

By setting the second clutch C2 to the coupling state, the second coupled body Rc-Sb and the sun gear Sd (sixth element) of the fourth planetary gear mechanism PG4 rotate at the same speed. By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rd (tenth element) of the second planetary gear mechanism PG2, to which the output member 33 is coupled, becomes "10th" shown in FIG. 3, thereby shifting to tenth gear.

When shifting to reverse gear, the two-way clutch F1 is set to the fixing state ("L" in FIG. 4), the second brake B2 is set to the fixing state, and the third clutch C3 is set to the coupling state.

By setting the second brake B2 to the fixing state and the third clutch C3 to the coupling state, the rotation speed of the first coupled body Cc-Cd-Ra becomes i/(i+1). By setting the two-way clutch F1 to the fixing state, the rotation speed of the third coupled body Ca-Cb becomes "0".

Then, the rotation speed of the ring gear Rb (tenth element) of the second planetary gear mechanism PG2, to which the output member 33 is coupled, becomes "Rvs" (reverse rotation) shown in FIG. 3; thereby shifting to reverse gear.

Figure 5:
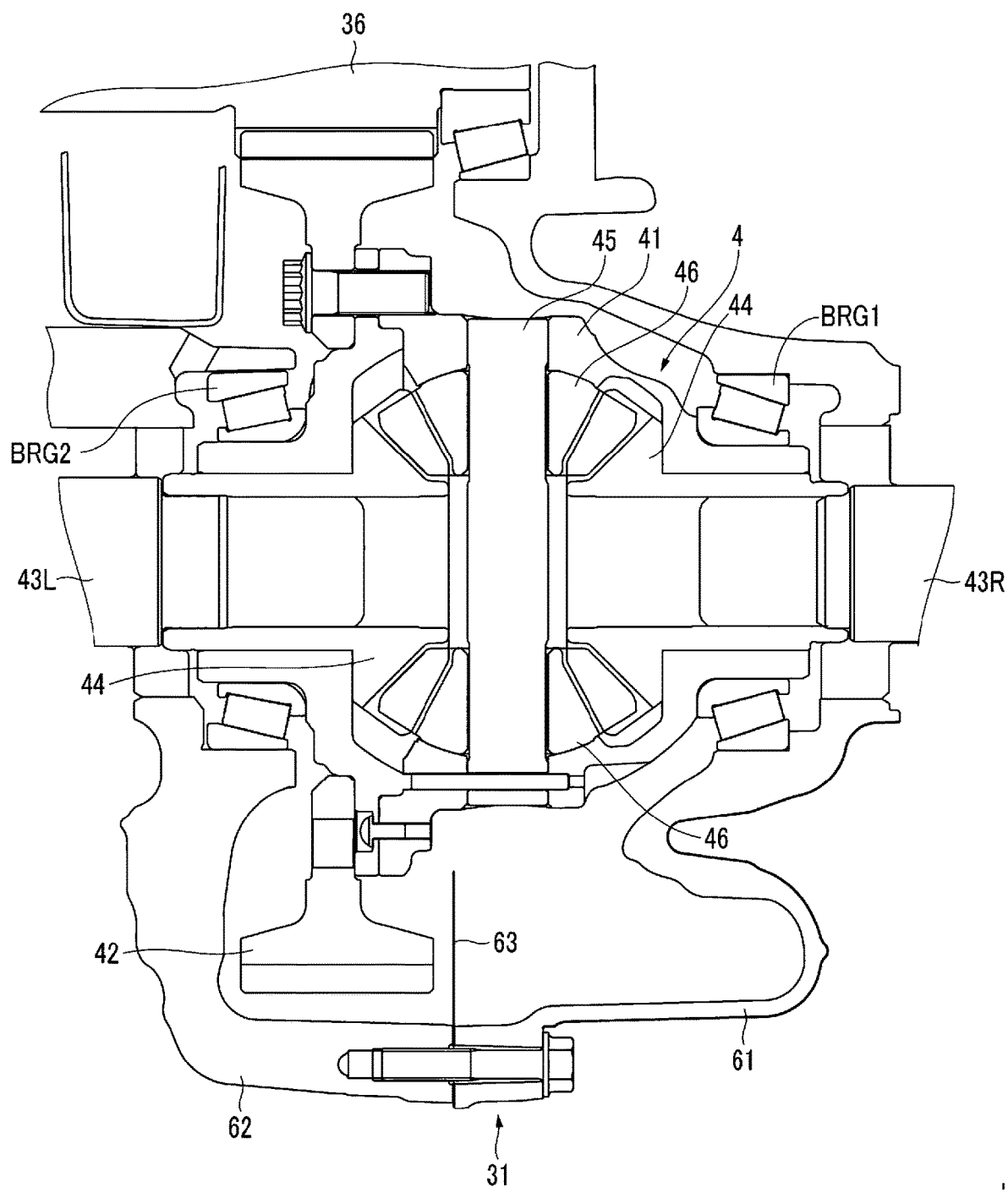
FIG. 5 is a partial sectional front view of a transmission case of the power transmission device shown in FIG. 1.

Referring back to FIG. 2, the front differential gear 4 includes a differential case 41, which is rotatably supported by the transmission case 31 of the transmission 3 (see FIG. 5). The final driven gear 42, which meshes with the final drive gear 36 attached to the idling shaft 35, is fixed to the outer periphery of the differential case 41.

Rotation of the idling shaft 35 of the transmission 3 is transmitted to the differential case 41 via the final drive gear 36 and the final driven gear 42. Rotation of the differential case 41 is transmitted to the left front axle 7L and the right front axle 7R in accordance with the load on the left front wheel WFL and the right front wheel WFR.

A left front output shaft 43L, which is connected to the left front axle 7L, and a right front output shaft 43R, which is connected to the right front axle 7R, are fitted into the differential case 41 so as to be relatively rotatable. A differential side gear 44 is spline-joined to each of opposing ends of the left front output shaft 43L and the right front output shaft 43R.

A pinion shaft 45 is fixed in the differential case 41 so as to extend perpendicular to the left front output shaft 43L and the right front output shaft 43R. A pair of pinion gears 46, which mesh with each of the two differential side gears 44, are rotatably supported by the pinion shaft 45.

The transfer device 5 includes a transfer input shaft 51, to which driving power is transmitted from the final driven gear 42 of the front differential gear 4, and a transfer output shaft 52, to which driving power is transmitted from the transfer input shaft 51 and which transmits the driving power to the propeller shaft 8.

At one end portion of the transfer input shaft 51 on the front differential gear 4 side, a transfer input gear 53, which meshes with the final driven gear 42, is spline-fitted and rotatably supported. At an opposite end portion of the transfer input shaft 51, a first bevel gear 54, which is a helical gear, is disposed.

At an end portion (front end) of the transfer output shaft 52 on the transfer input shaft 51 side, a second bevel gear 55, which is a helical gear, is disposed. To a back end of the transfer output shaft 52, an end of the propeller shaft 8 is joined.

Because the first bevel gear 54 meshes with the second bevel gear 55, rotation of the transfer input shaft 51 is transmitted to the propeller shaft 8 (see FIG. 1) via the transfer output shaft 52.

Next, referring to FIGS. 5 to 9, the transmission case 31 (housing) and a lubricating oil supply structure of the power transmission device PT, which is disposed in the transmission case 31, will be described. The lubricating oil supply structure supplies lubricating oil to a first bearing BRG1 (see FIG. 5), which rotatably supports the final driven gear 42 in the transmission case 31, and lubricates the first bearing BRG1.

First, referring to FIGS. 5 to 8, the configuration of the lubricating oil supply structure will be described.

As illustrated in FIG. 5, the transmission case 31 includes a TC-side case member 61 (torque-converter-side case member) and a TM-side case member 62 (transmission-side case member), which are joined to each other along the opening edges thereof. A gasket 63 is held between the opening edge of the TC-side case member 61 and the opening edge of the TM-side case member 62 in order to prevent leakage of lubricating oil from the inside.

In the transmission case 31, the differential case 41 (that is, the final driven gear 42, which is disposed on the outer periphery of the differential case 41) is rotatably supported by the first bearing BRG1 and a second bearing BRG2. The first bearing BRG1 is fixed to the TC-side case member 61. The second bearing BRG2 is fixed to the TM-side case member 62.

Figure 6:
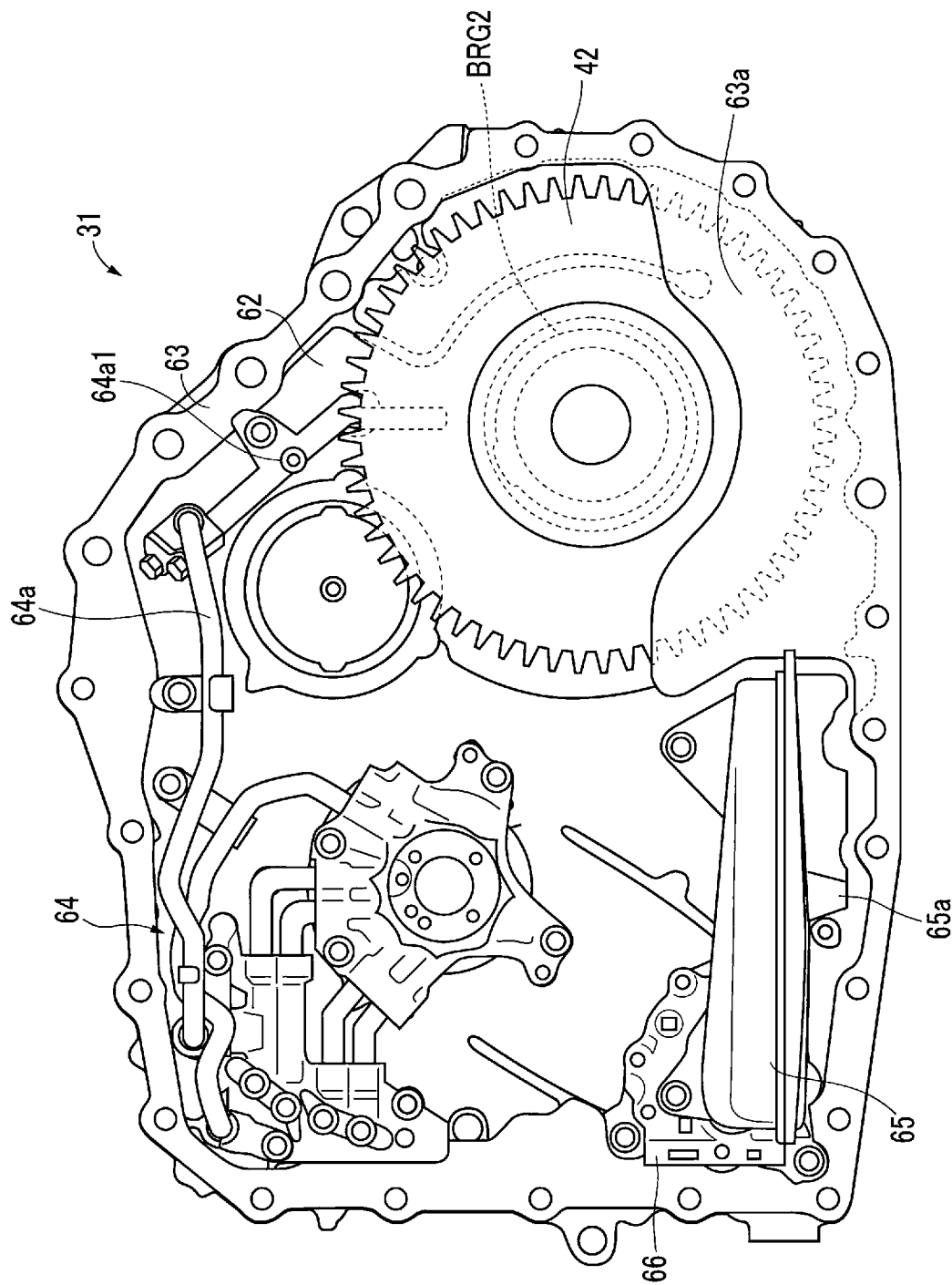
FIG. 6 is a side view illustrating a TM-side case member of the transmission case shown in FIG. 5 and components fixed to the TM-side case member.

As illustrated in FIG. 6, a discharge mechanism 64 (lubricating oil supply mechanism), components of the power transmission device PT (such as the second bearing BRG2), a strainer 65, and a pump 66 are attached to the TM-side case member 62.

The discharge mechanism 64 is disposed at a position that is in an upper part of the space in the TM-side case member 62 and that corresponds to a hydraulic mechanism such as the torque converter 2. The discharge mechanism 64 discharges (supplies) at least a part of hydraulic oil used by the hydraulic mechanism into the transmission case 31 via a supply pipe 64a as lubricating oil for the second bearing BRG2.

The supply pipe 64a has an ejection outlet 64a1 that branches off from the supply pipe 64a so that a part of the lubricating oil can be supplied toward a position above the first bearing BRG1 in the TC-side case member 61.

A lubricating oil supply mechanism according to the present disclosure is not limited to a mechanism that supplies lubricating oil to the second bearing BRG2 as the discharge mechanism 64 does. The lubricating oil supply mechanism may supply lubricating oil to an internal component other than the second bearing BRG2. For example, a mechanism that supplies lubricating oil to the differential case 41 may be used as a lubricating oil supply mechanism according to the present disclosure.

The strainer 65 and the pump 66 are disposed at positions that are in a lower part of the space in the TM-side case member 62, that are closer to the TC-side case member 61 than the gasket 63 (in other words, an end surface of the TM-side case member 62) is, and that are separated from the final driven gear 42 in a direction that crosses the rotation axis of the final driven gear 42 (in other words, in front of the final driven gear 42 in the driving direction of the vehicle V).

The strainer 65 has a suction inlet 65a, through which the strainer 65 suctions lubricating oil into the strainer 65 from an oil sump, in a central part of a lower surface thereof. The strainer 65 suctions lubricating oil from an oil sump of lubricating oil collected in the transmission case 31 through the suction inlet 65a and supplies the lubricating oil to the hydraulic mechanism via the pump 66.

Figure 7:
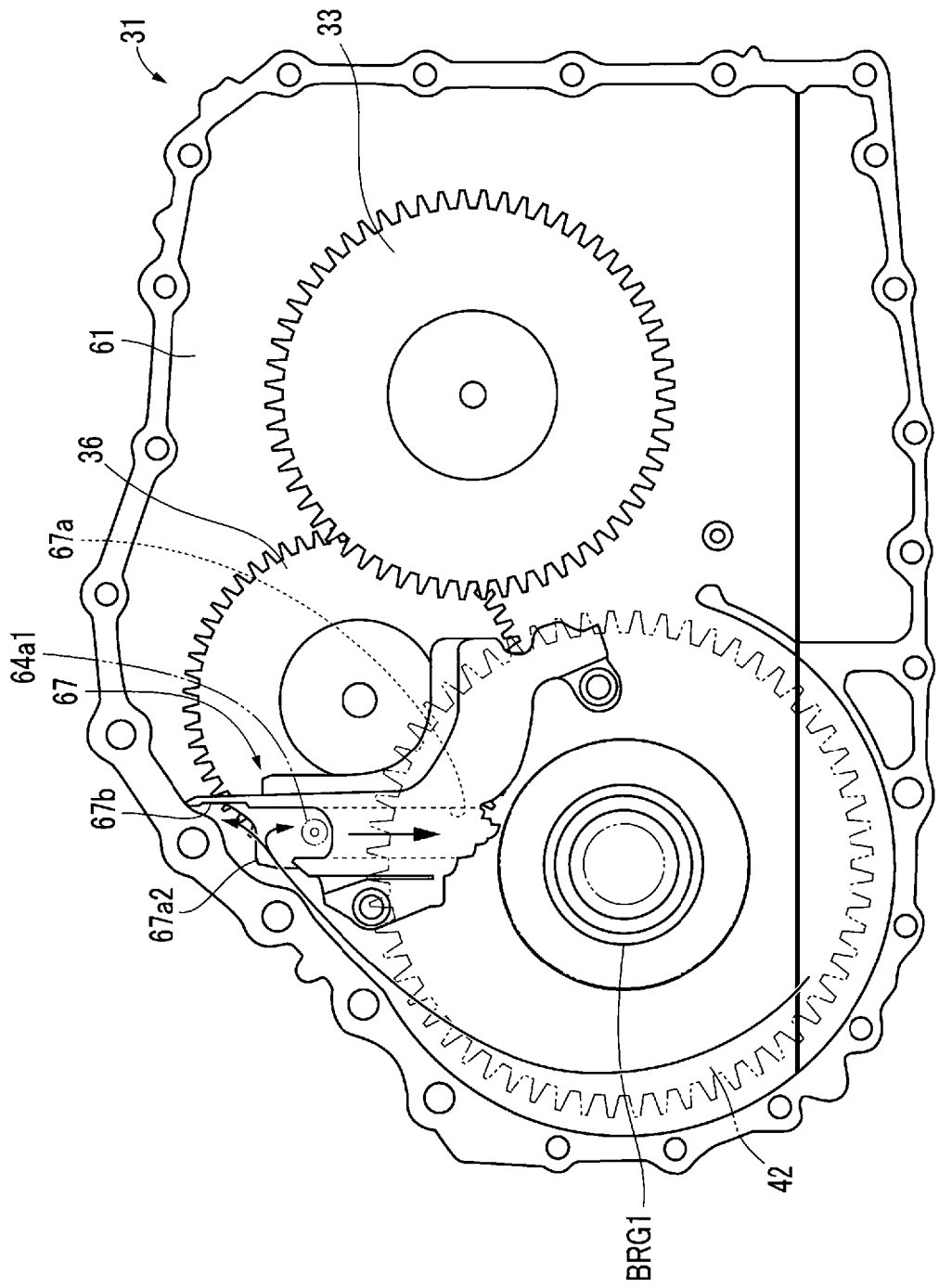
FIG. 7 is a side view illustrating a TC-side case member of the transmission case shown in FIG. 5 and components fixed to the TC-side case member.

As illustrated in FIG. 7, a baffle plate 67 (baffle), which is used to lubricate the second bearing BRG2, is attached to the TC-side case member 61 at a position above the final driven gear 42 (that is, above the first bearing BRG1). The final drive gear 36 is disposed in the transmission case 31 at a position lateral to the baffle plate 67.

Figure 8:
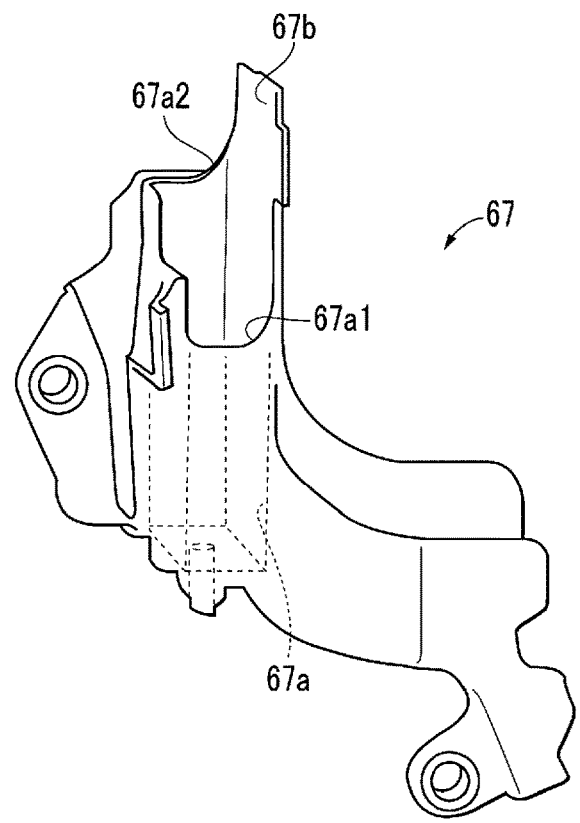
FIG. 8 is a perspective view illustrating the shape of a baffle plate shown in FIG. 7.

As illustrated in FIG. 8, the baffle plate 67 includes a tubular oil supply passage 67a, which extends vertically, and a lubricating oil receiving surface (a lubricating oil receiver) 67b, which is disposed above the oil supply passage 67a.

A lower end portion of the oil supply passage 67a (that is, an end portion from which lubricating oil guided by the baffle plate 67 is discharged) is located above the first bearing BRG1, which is to be lubricated, when the baffle plate 67 is set in the TC-side case member 61. To be specific, a lubricating oil discharge hole, which is formed in the lower end portion of the oil supply passage 67a, is located so that the lubricating oil discharge hole can face a hole that extends through the outer race of the first bearing BRG1 in the radial direction.

Figure 9:
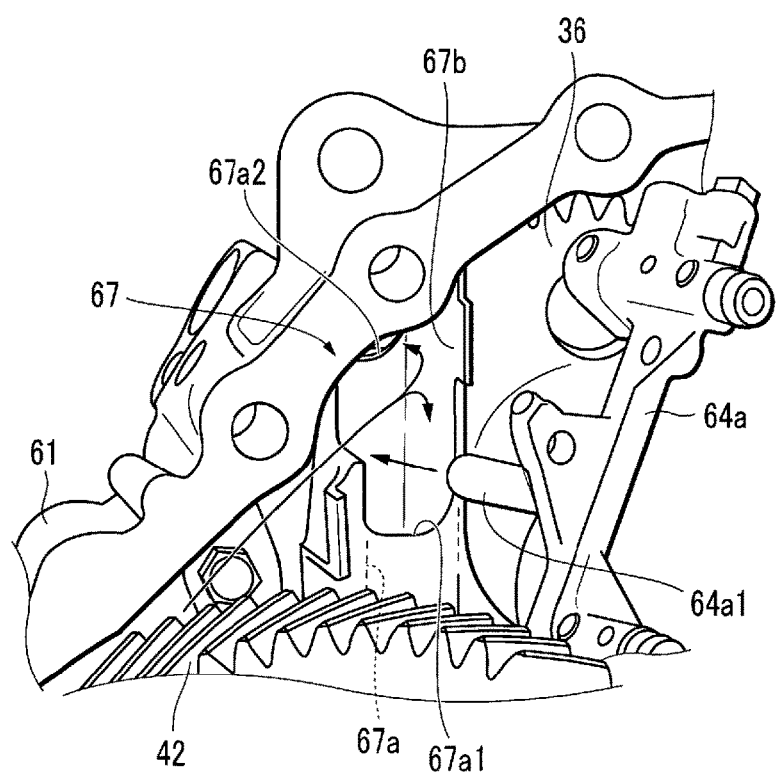
FIG. 9 is a partial enlarged perspective view of the TM-side case member of the transmission case shown in FIG. 5 and components fixed to the TM-side case member.

A first opening 67a1 is formed in a side surface of an upper end portion of the oil supply passage 67a at a position corresponding to the ejection outlet 64a1 of the supply pipe 64a of the discharge mechanism 64 (see FIG. 9). An end portion of the ejection outlet 64a1 is inserted into the first opening 67a1 (although, in FIG. 9, the end portion is not inserted into the first opening 67a1 in order to facilitate understanding). A second opening 67a2 is formed in the upper end portion of the oil supply passage 67a at a position corresponding to teeth of the final drive gear 36 (see FIG. 7).

The second opening 67a2 is located above the first opening 67a1, and lubricating oil ejected from the ejection outlet 64a1 is guided to the oil supply passage 67a without overflowing from the second opening 67a2.

Alternatively, the first opening 67a1 may be located at the same height as the second opening 67a2 or may be located above the second opening 67a2 so that a part of lubricating oil ejected from the ejection outlet 64a1 can be supplied to the teeth of the final drive gear 36 via the second opening 67a2.

Next, referring to FIGS. 7 and 9, flow of lubricating oil due to the lubricating oil supply structure of the power transmission device PT will be described. The thick line in FIG. 7 indicates the oil surface of an oil sump formed in the transmission case 31. The arrows in FIGS. 7 and 9 indicate flows of lubricating oil that is splashed by the final driven gear 42.

As illustrated in FIG. 7, lubricating oil that is discharged into the transmission case 31 by the discharge mechanism 64 forms an oil sump in a lower part of the space in the transmission case 31. Because a lower part of the final driven gear 42 is immersed in the oil sump, lubricating oil is splashed from the oil sump in accordance with rotation of the final driven gear 42.

As illustrated FIGS. 7 and 9, at least a part of lubricating oil splashed by the final driven gear 42 is received by the lubricating oil receiving surface 67b of the baffle plate 67, and at least a part of lubricating oil received by the lubricating oil receiving surface 67b is guided to the oil supply passage 67a. Thus, when the rotation speed of the final driven gear 42 is sufficiently high, lubricating oil splashed by the final driven gear 42 is guided to the first bearing BRG1 via the oil supply passage 67a of the baffle plate 67.

The rotation speed of the final driven gear 42 is not constant, and the final driven gear 42 may rotate at a low speed depending on the driving condition of the vehicle V. In such a case, as the rotation speed of the final driven gear 42 decreases, the amount of lubricating oil splashed by the final driven gear 42 also decreases.

However, with the lubricating oil supply structure of the power transmission device PT, lubricating oil discharged from the hydraulic mechanism is guided to the oil supply passage 67a via the supply pipe 64a of the discharge mechanism 64 and the first opening 67a1 of the baffle plate 67 and is supplied to the first bearing BRG1. The amount of lubricating oil supplied from the discharge mechanism 64 is set in accordance with the rotation speed of the oil pump and the like and is not affected by the rotation speed of the final driven gear 42.

Therefore, even if the rotation speed of the final driven gear 42 decreases and the amount of lubricating oil splashed by the final driven gear 42 (that is, the amount of lubricating oil supplied to the first bearing BRG1 by being splashed by the final driven gear 42) decreases, a predetermined amount of lubricating oil is stably supplied to the first bearing BRG1 from the discharge mechanism 64.

A part of lubricating oil splashed by the final driven gear 42 and received by the lubricating oil receiving surface 67b collides with and bounces off the lubricating oil receiving surface 67b, then passes through the second opening 67a2, and is supplied to the teeth of the final drive gear 36, which are disposed so as to be adjacent to the lubricating oil receiving surface 67b.

Thus, with the lubricating oil supply structure of the power transmission device PT, lubricating oil can be supplied not only to the first bearing BRG1 but also to the final drive gear 36, which is located above the first bearing BRG1.

The present disclosure is not limited to the embodiment described above with reference to the drawings.

For example, in the embodiment described above, the discharge mechanism 64 (lubricating oil supply mechanism), which is disposed in the TM-side case member (transmission-side case member), lubricates the first bearing BRG1, which is attached to the TC-side case member (torque-converter-side case member).

However, a lubrication structure of a power transmission device according to the present disclosure is not limited to such a structure. For example, a bearing to be lubricated may be attached to the transmission-side case member, and the lubricating oil supply mechanism may be disposed in the torque-converter-side case member. In this case, the second bearing BRG2 corresponds to a bearing according to the present disclosure.

In the embodiment described above, the baffle plate 67 of the final driven gear 42 is used as a baffle. The baffle plate 67 is configured so that lubricating oil can be supplied to the final drive gear 36, which is adjacent to the baffle plate 67, via the second opening 67a2. This is in order to lubricate a gear that is located in an upper part by using lubricating oil splashed by the final driven gear and to save space by integrating components for supplying lubricating oil.

However, a baffle of a lubrication structure of a power transmission device according to the present disclosure is not limited to a baffle having such a configuration. The baffle only needs to include a tubular oil supply passage that guides lubricating oil to a bearing from above the bearing and a lubricating oil receiving surface that receives lubricating oil splashed by the final driven gear and that is disposed above the oil supply passage. Therefore, the baffle may be disposed at a position that is not adjacent to a gear above the final driven gear, and the second opening may be omitted.

In the embodiment described above, the discharge mechanism 64, which discharges at least a part of hydraulic oil used by the hydraulic mechanism into the transmission case 31, is used as a lubricating oil supply mechanism.

However, a lubricating oil supply mechanism according to the present disclosure is not limited to such a discharge mechanism. The lubricating oil supply mechanism may be any mechanism that can supply lubricating oil to an internal component disposed in the housing. For example, the lubricating oil supply mechanism according to the present disclosure may be a mechanism that supplies lubricating oil ejected from an oil pump directly to the second bearing BRG2 (not through the hydraulic mechanism).

A lubrication structure of a power transmission device (for example, a power transmission device PT in an embodiment, the same applies hereafter) according to the present disclosure is a lubrication structure for lubricating a bearing (for example, a first bearing BRG1 in the embodiment, the same applies hereafter) that rotatably supports a final driven gear (for example, a final driven gear 42 in the embodiment, the same applies hereafter) disposed in a housing (for example, a transmission case 31 in the embodiment, the same applies hereafter) of the power transmission device. The lubrication structure includes a lubricating oil supply mechanism (for example, a discharge mechanism 64 in the embodiment, the same applies hereafter) that supplies lubricating oil to an internal component (for example, a second bearing BRG2 in the embodiment, the same applies hereafter) disposed in the housing, and a baffle (for example, a baffle plate 67 in the embodiment, the same applies hereafter) that is located in the housing and above the bearing. The baffle includes a tubular oil supply passage (for example, an oil supply passage 67a in the embodiment, the same applies hereafter) that guides the lubricating oil to the bearing from above the bearing; and a lubricating oil receiving surface (for example, a lubricating oil receiving surface 67b in the embodiment, the same applies hereafter) that is disposed above the oil supply passage, that receives the lubricating oil splashed by the final driven gear, and that guides the lubricating oil to the oil supply passage. The lubricating oil supply mechanism supplies the lubricating oil to the oil supply passage.

With the lubrication structure according to the present disclosure, not only lubricating oil splashed by the final driven gear is supplied to the bearing by the baffle plate, but also lubricating oil discharged from the hydraulic mechanism is supplied to the bearing. Here, the amount of lubricating oil supplied from the discharge mechanism is determined in accordance with the rotation speed of the oil pump and is not affected by the rotation speed of the final driven gear. That is, even when the rotation speed of the final driven gear decreases, lubricating oil can be suppled from the hydraulic mechanism.

Accordingly, with the lubrication structure according to the present disclosure, the bearing that rotatably supports the final driven gear can be stably lubricated irrespective of the amount of lubricating oil that the final driven gear splashes.

In the lubrication structure according to the present disclosure, preferably, a gear (for example, a final drive gear 36 in the embodiment, the same applies hereafter) is disposed in the housing and above the final driven gear so as to be adjacent to the baffle, and the lubricating oil receiving surface is disposed adjacent to teeth of the gear.

With this structure, lubricating oil that is scattered when the lubricating oil is received by the receiving surface can be supplied to the gear, which is disposed above the final driven gear so as to be adjacent to the final driven gear. Thus, a gear that is located in an upper part can also be appropriately lubricated with lubricating oil splashed by the final driven gear.

In the lubrication structure according to the present disclosure, preferably, the housing at least includes a transmission-side case member (for example, a TM-side case member 62 in the embodiment, the same applies hereafter) and a torque-converter-side case member (for example, a TC-side case member 61 in the embodiment, the same applies hereafter), the bearing is disposed in the torque-converter-side case member, and the lubricating oil supply mechanism is disposed in the transmission-side case member.

With this structure, the bearing disposed in the torque-converter-side case member, in which the lubricating oil supply mechanism is not disposed, can also be appropriately lubricated by using the lubricating oil supply mechanism disposed in the transmission-side case member.

In the lubrication structure according to the present disclosure, the baffle may include an opening (for example, a first opening 67a1 in the embodiment, the same applies hereafter) in a side surface of the oil supply passage, the lubricating oil supply mechanism may include an ejection outlet (for example, an ejection outlet 64a1 in the embodiment, the same applies hereafter) for ejecting the lubricating oil, and an end portion of the ejection outlet may be inserted into the oil supply passage via the opening.

Obviously, numerous modifications and variations of the present invention are possible in light of the above teachings. It is therefore to be understood that within the scope of the appended claims, the invention may be practiced otherwise than as specifically described herein.

For example, the final driven gear 34b may be a non-final driven gear to be driven by a non-final driving gear.

What is claimed is:
1. A lubrication structure of a power transmission device for lubricating a bearing that rotatably supports a first gear that is a final driven gear disposed in a housing of the power transmission device, the lubrication structure comprising:
    a lubricating oil supply mechanism that supplies lubricating oil to an internal component disposed in the housing;
    a baffle that is located in the housing and above the bearing; and
    a second gear disposed in the housing and above the first gear so as to be adjacent to the baffle, wherein the baffle includes
    a tubular oil supply passage that guides the lubricating oil to the bearing from above the bearing,
    a lubricating oil receiving surface that is disposed above the oil supply passage, that receives the lubricating oil splashed by the first gear, and that guides the lubricating oil to the oil supply passage,
    a first opening provided in a side surface of the oil supply passage, and
    a second opening provided above the first opening,
wherein the lubricating oil supply mechanism supplies the lubricating oil to the oil supply passage,
wherein the lubricating oil receiving surface is disposed adjacent to teeth of the second gear,
wherein the second opening is provided at a position corresponding to teeth of the second gear,
wherein the lubricating oil supply mechanism includes an ejection outlet for ejecting the lubricating oil, and
wherein an end portion of the ejection outlet is inserted into the oil supply passage via the first opening.

2. The lubrication structure according to claim 1,
wherein the housing at least includes a transmission-side case member and a torque-converter-side case member,
wherein the bearing is disposed in the torque-converter-side case member, and
wherein the lubricating oil supply mechanism is disposed in the transmission-side case member.

3. A lubrication structure of a power transmission device, comprising:
    a housing in which a first gear is to be housed;
    a bearing provided in the housing to rotatably support the first gear;
    a second gear disposed in the housing above the first gear in a height direction of the power transmission device so as to be adjacent to a baffle;
    the baffle provided in the housing above the bearing in the height direction, the baffle comprising:
        a tubular oil supply passage via which lubricating oil is supplied to the bearing;
        a side wall extending in the height direction to define the tubular oil supply passage;
        a lubricating oil receiver connected to and provided above the tubular oil supply passage in the height direction to receive lubricating oil splashed by the first gear in order to supply the received lubricating oil to the tubular oil supply passage;
        a first opening provided in the side wall; and
        a second opening provided above the first opening in the height direction; and
    an additional lubricating oil supply mechanism to supply lubricating oil to the tubular oil supply passage,
wherein the lubricating oil receiver is disposed adjacent to teeth of the second gear,
wherein the second opening is provided at a position corresponding to teeth of the second gear,
wherein the additional lubricating oil supply mechanism includes an ejection outlet to eject the lubricating oil, and
wherein an end of the ejection outlet is inserted into the tubular oil supply passage via the first opening of the side wall of the baffle.

4. The lubrication structure according to claim 3,
wherein the housing at least includes a transmission-side case member and a torque-converter-side case member,
wherein the bearing is disposed in the torque-converter-side case member, and
wherein the lubricating oil supply mechanism is disposed in the transmission-side case member.

5. The lubrication structure according to claim 3, further comprising:
    the first gear provided in the housing.

6. The lubrication structure according to claim 5, wherein the first gear is a final driven gear in the power transmission device.

7. The lubrication structure according to claim 3, wherein the additional lubricating oil supply mechanism is to supply the lubricating oil to a component provided in the housing.

* * * * *